US012420948B2

(12) United States Patent
Storozuk et al.

(10) Patent No.: US 12,420,948 B2
(45) Date of Patent: Sep. 23, 2025

(54) METHODS AND APPARATUS FOR LIGHTNING STRIKE PROTECTION

(71) Applicant: The Boeing Company, Arlington, VA (US)

(72) Inventors: Marc Gregory Storozuk, West St. Paul (CA); James Paul Hacault, Winnipeg (CA)

(73) Assignee: The Boeing Company, Arlington, VA (US)

( * ) Notice: Subject to any disclaimer, the term of this patent is extended or adjusted under 35 U.S.C. 154(b) by 226 days.

(21) Appl. No.: 18/317,553

(22) Filed: May 15, 2023

(65) Prior Publication Data

US 2024/0383613 A1 Nov. 21, 2024

(51) Int. Cl.
*B64D 45/02* (2006.01)
*H02G 13/00* (2006.01)

(52) U.S. Cl.
CPC ............ *B64D 45/02* (2013.01); *H02G 13/00* (2013.01)

(58) Field of Classification Search
CPC ........ B64D 45/02; B64D 13/02; H02G 13/00; H02G 13/80; C23C 4/12; B64C 1/12; B32B 15/20; B32B 15/08; B32B 2605/18
USPC .......................................................... 361/218
See application file for complete search history.

(56) References Cited

U.S. PATENT DOCUMENTS

| | | | |
|---|---|---|---|
| 3,989,984 A | 11/1976 | Amason et al. | |
| 4,579,248 A * | 4/1986 | Gorges | B64D 37/005 220/327 |
| 4,751,979 A * | 6/1988 | Wiseman | F02C 7/24 181/213 |
| 4,755,904 A | 7/1988 | Brick | |
| 5,127,601 A * | 7/1992 | Schroeder | B64D 45/02 D12/345 |
| 5,894,106 A | 4/1999 | Schwenk et al. | |
| 6,237,325 B1 | 5/2001 | Hogie et al. | |
| 7,561,402 B2 | 7/2009 | Heeter | |
| 7,913,385 B2 * | 3/2011 | Carlson | B64C 1/1492 29/841 |
| 10,791,657 B1 | 9/2020 | Barnes | |
| 11,420,765 B2 | 8/2022 | Barnes | |

(Continued)

FOREIGN PATENT DOCUMENTS

EP 4464604 A1 11/2024

OTHER PUBLICATIONS

European Patent Office, "Extended European Search Report," issued in connection with European Patent Application No. 24175143.7, dated Oct. 8, 2024, 7 pages.

*Primary Examiner* — Danny Nguyen
(74) *Attorney, Agent, or Firm* — Hanley, Flight & Zimmerman, LLC

(57) ABSTRACT

Methods and apparatus for lightning strike protection are disclosed. A disclosed example apparatus includes a frame supporting an exterior panel, the exterior panel having a first side that at least partially defines an exterior surface of a vehicle, a shield panel placed at a second side of the exterior panel opposite the first side, and a spring extending from the frame at a first portion of the spring, a second portion of the spring being at least one of ramped or curved, the second portion contacting the shield panel to define an electrical coupling between the shield panel and an electrically conductive portion associated with the frame.

20 Claims, 9 Drawing Sheets

(56) References Cited

U.S. PATENT DOCUMENTS

| | | | |
|---|---|---|---|
| 2004/0229607 A1* | 11/2004 | La Chapelle | B64D 45/0063 |
| | | | 455/431 |
| 2009/0184199 A1 | 7/2009 | Leisten et al. | |
| 2014/0097018 A1* | 4/2014 | Russell | B32B 37/18 |
| | | | 156/107 |
| 2020/0031493 A1* | 1/2020 | Birchak | B64D 13/02 |
| 2021/0300588 A1* | 9/2021 | Barnes | B64D 45/02 |

* cited by examiner

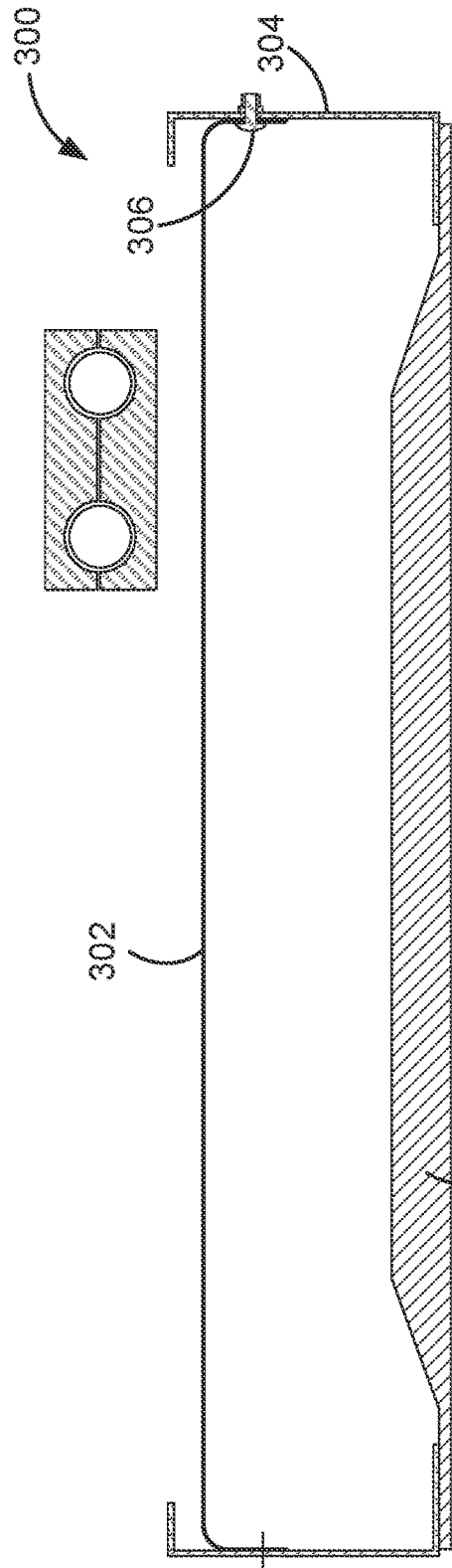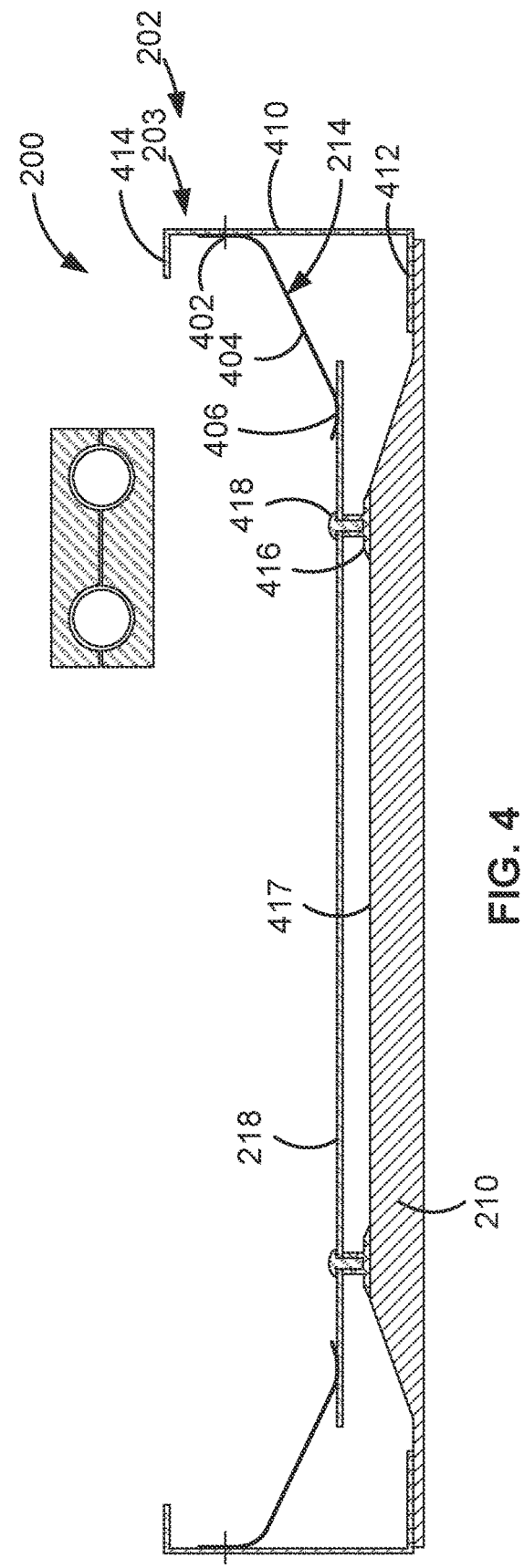
FIG. 3 (PRIOR ART)
FIG. 4

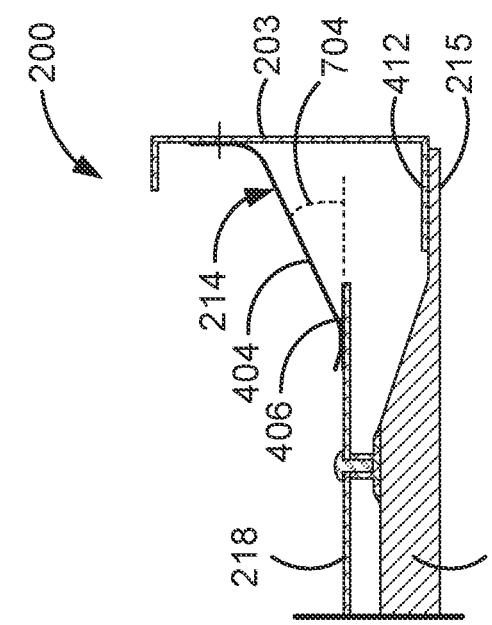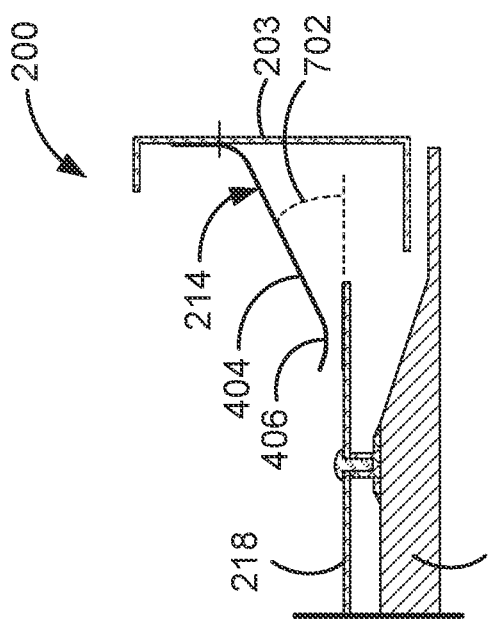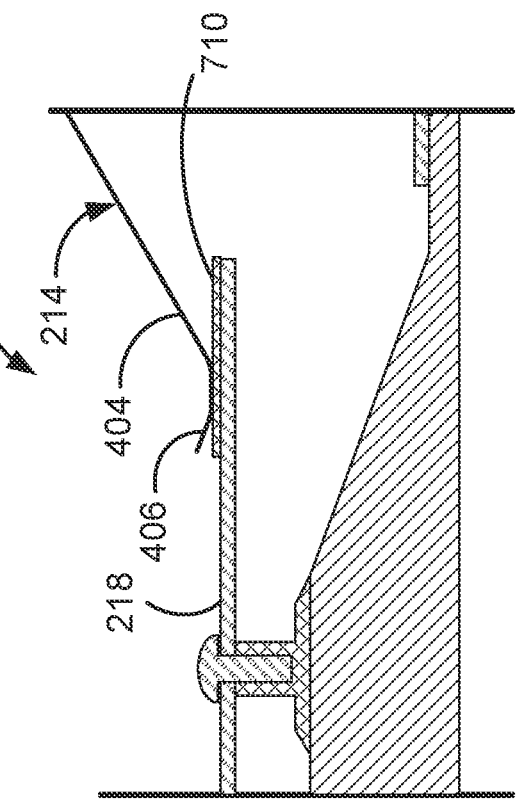

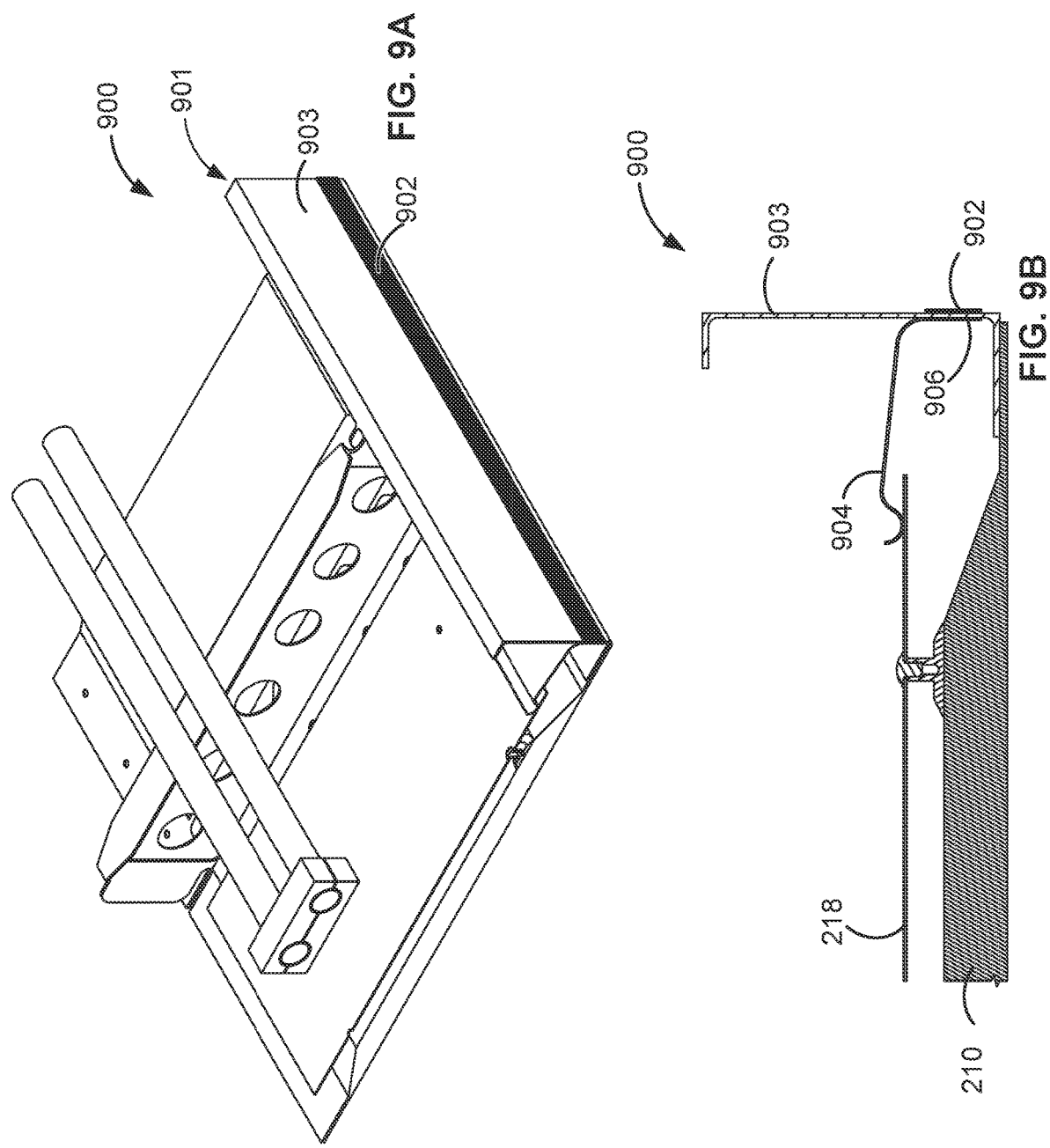

METHODS AND APPARATUS FOR LIGHTNING STRIKE PROTECTION

FIELD OF THE DISCLOSURE

This disclosure relates generally to aircraft and, more particularly, to methods and apparatus for lighting strike protection.

BACKGROUND

For aircraft, components, systems or systems element such as, but not limited to, electrical wires or hydraulic tubes can necessitate protection from lightning attachment. These components are typically covered by an external composite panel. In some situations, secondary lightning protection is utilized such that a metal barrier shield is utilized between the exterior panel and the components.

Known aluminum aircraft exterior panels typically have inherent lightning protection by providing relatively high electrical conductivity along with a relatively low electrical resistance at an interface between an exterior panel to a substructure (e.g., a grounding substructure). For such aluminum exterior panels, protection against lightning penetration can be achieved by adjusting a thickness thereof. In contrast, known composite material exterior panels weigh less than the typical aluminum exterior panels. However, composite materials used in such panels are relatively less electrically conductive and can have a relatively high electrical resistance at a fastened interface thereof, thereby necessitating an additional metal/metallic shield to provide a ground path to the aforementioned substructure.

SUMMARY

An example apparatus includes a frame supporting an exterior panel, the exterior panel having a first side that at least partially defines an exterior surface of a vehicle, a shield panel placed at a second side of the exterior panel opposite the first side, and a spring extending from the frame at a first portion of the spring, a second portion of the spring being at least one of ramped or curved, the second portion contacting the shield panel to define an electrical coupling between the shield panel and an electrically conductive portion of the frame.

An example exterior panel assembly for use with a vehicle includes an exterior panel to at least partially define an external surface of the vehicle, an electrically conductive frame to position the exterior panel relative to the external surface, an electrically conductive shield placed at an interior volume of the exterior panel assembly, and a spring coupled to at least one of the frame or the shield, the spring being ramped relative to the shield and extending between (i) at least one of the frame or an electrically conductive component associated with the frame, and (ii) the shield to define an electrical coupling therebetween.

An example method includes placing a shield panel at an interior facing side of an exterior panel that is supported by a frame, the exterior panel having an exterior facing side opposite the interior facing side, the exterior facing side at least partially defining an exterior surface of a vehicle, and displacing a spring extending from the frame at a first portion of the spring, the spring at least one of ramped or curved, the spring displaced to define an electrical coupling between the shield panel and an electrically conductive portion associated with the frame.

BRIEF DESCRIPTION OF THE DRAWINGS

FIG. 3 is a cross-sectional view of a known composite panel assembly.

FIG. 4 is a cross-sectional view of the example composite panel assembly of FIG. 2.

FIGS. 7A-7C are detailed cross-sectional views of the example composite assembly shown in FIGS. 2 and 4.

FIGS. 9A and 9B depict an example composite panel assembly with a non-electrically conductive frame architecture.

Figure 1:
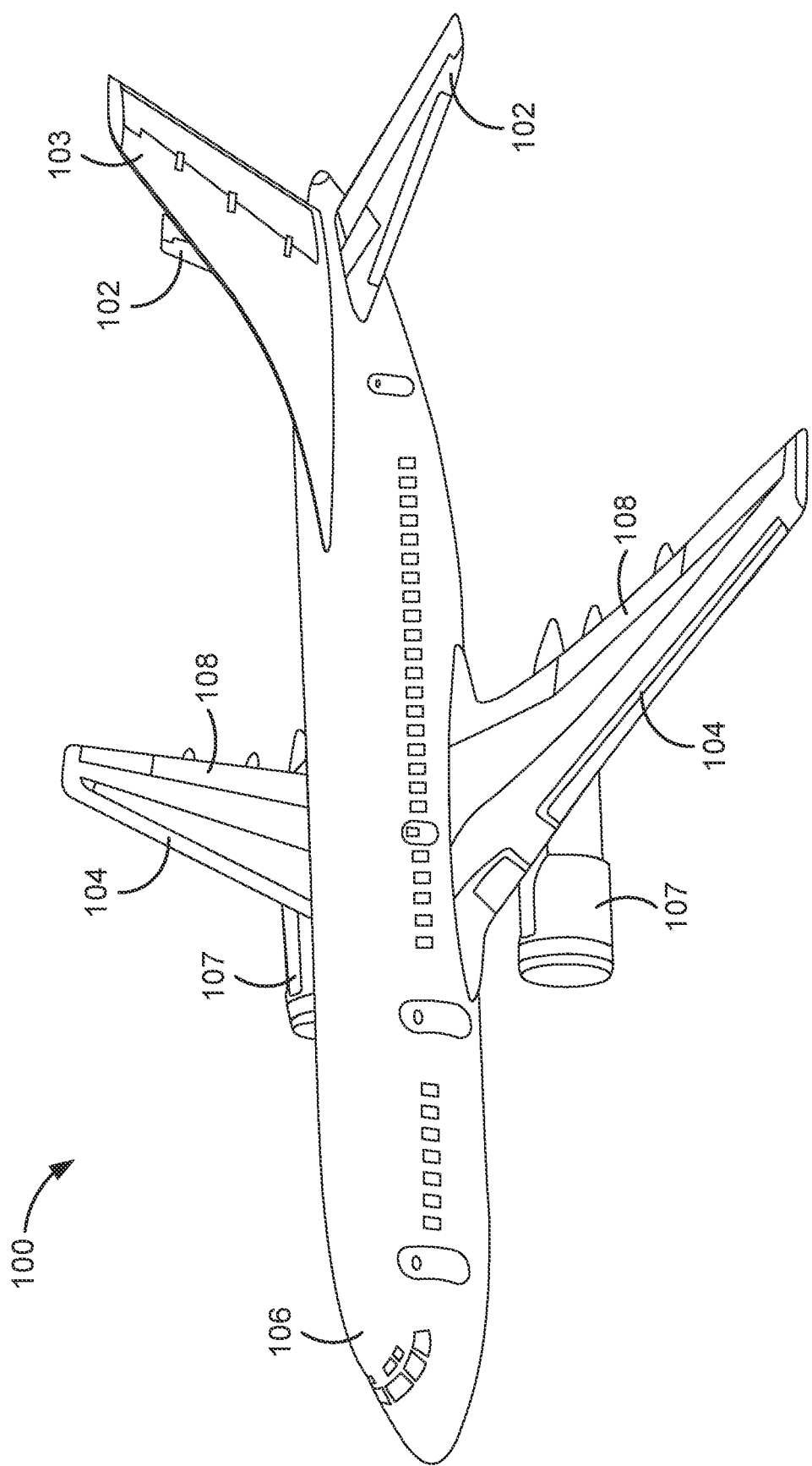
FIG. 1 illustrates an example aircraft in which examples disclosed herein can be implemented.

In general, the same reference numbers will be used throughout the drawing(s) and accompanying written description to refer to the same or like parts. The figures are not necessarily scaled. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description.

DETAILED DESCRIPTION

Methods and apparatus for lighting strike protection are disclosed. Some known aircraft lighting strike protection systems utilize a conductive shield (e.g., a metal shield, a metallic shield, etc.) positioned on an interior side (e.g., an inner facing side) of an exterior composite panel for secondary lightning protection. However, removal, maintenance, service or inspection of the conductive shield can necessitate additional steps, time and/or processing. As a result, servicing, removal and/or maintenance of components behind and/or above exterior panels can result in increased costs (e.g., labor costs, downtime costs, etc.), as well as aircraft downtime.

Examples disclosed herein enable components above and/or exterior panels to be serviced and maintained in a relatively quick manner, thereby reducing service time and costs associated therewith. Examples disclosed herein utilize an exterior panel (e.g., a composite material exterior panel) that is supported by a frame, which can be at least partially composed of a metal, metallic material, or a composite material, for example. In turn, a shield panel, which may be at least partially composed of a metal, or a metallic material, is positioned at an interior side and/or surface of the exterior panel. According to examples disclosed herein, a spring extends from the frame at a first portion of the spring. In turn, a second portion of the spring can be at least one of ramped, inclined or curved such that the second portion contacting the shield panel defines an electrical coupling between the shield panel and the frame (or a metal conductor positioned on or within the frame), thereby enabling the shield panel to function as a lighting attachment protection device.

In some examples, a spacer separates the shield panel from the exterior panel. According to examples disclosed herein, the spring can include a base portion to contact the frame, an angled portion that extends from the base portion, and a distal portion of the spring that defines a curved or arcuate distal end for contacting an electrically conductive component and/or or portion of the frame, where the angled portion is inclined relative to the base portion. Additionally or alternatively, the second portion of the spring includes, defines and/or supports an arcuate distal or hook-shaped end of the spring. In some examples, the shield panel contacts and engages an interior side of the exterior panel. In some such examples, the shield panel can be coupled to the exterior panel at the interior side of the exterior panel. Additionally or alternatively, in some examples, the interior side of the exterior panel is curved. In some such examples, the shield panel is curved to interface and/or align with a curvature of the exterior panel.

FIG. 1 illustrates an example aircraft 100 in which examples disclosed herein can be implemented. In particular, examples disclosed herein can be utilized to produce components and/or parts associated with the aircraft 100, for example. In the illustrated example of FIG. 1, the aircraft 100 includes horizontal tails 102, a vertical tail 103 and wings (e.g., fixed wings) 104 attached to a fuselage 106. The wings 104 of the illustrated example have engines 107, and control surfaces (e.g., flaps, ailerons, tabs, etc.) 108, some of which are located at a trailing edge or a leading edge of the wings 104. The control surfaces 108 may be displaced or adjusted (e.g., deflected, etc.) to provide lift during takeoff, landing and/or flight maneuvers.

In the illustrated example of FIG. 1, the horizontal tails 102, the vertical tail 103, the fuselage 106, the wings 104, the engines 107, the control surfaces 108 define external surfaces that can be composed of and/or at least partially defined by panels (e.g., exterior facing panels). Examples disclosed herein can be implemented for any surface and/or panel of the aircraft 100. Further, examples disclosed herein can also be applied to any other appropriate vehicle or stationary structure and/or application that utilizes shielding for lightning attachment protection/mitigation. Accordingly, examples disclosed herein can be utilized for rotorcraft, spacecraft, watercraft, submersibles, unmanned aerial vehicles, or stationary structures, etc.

Figure 2:
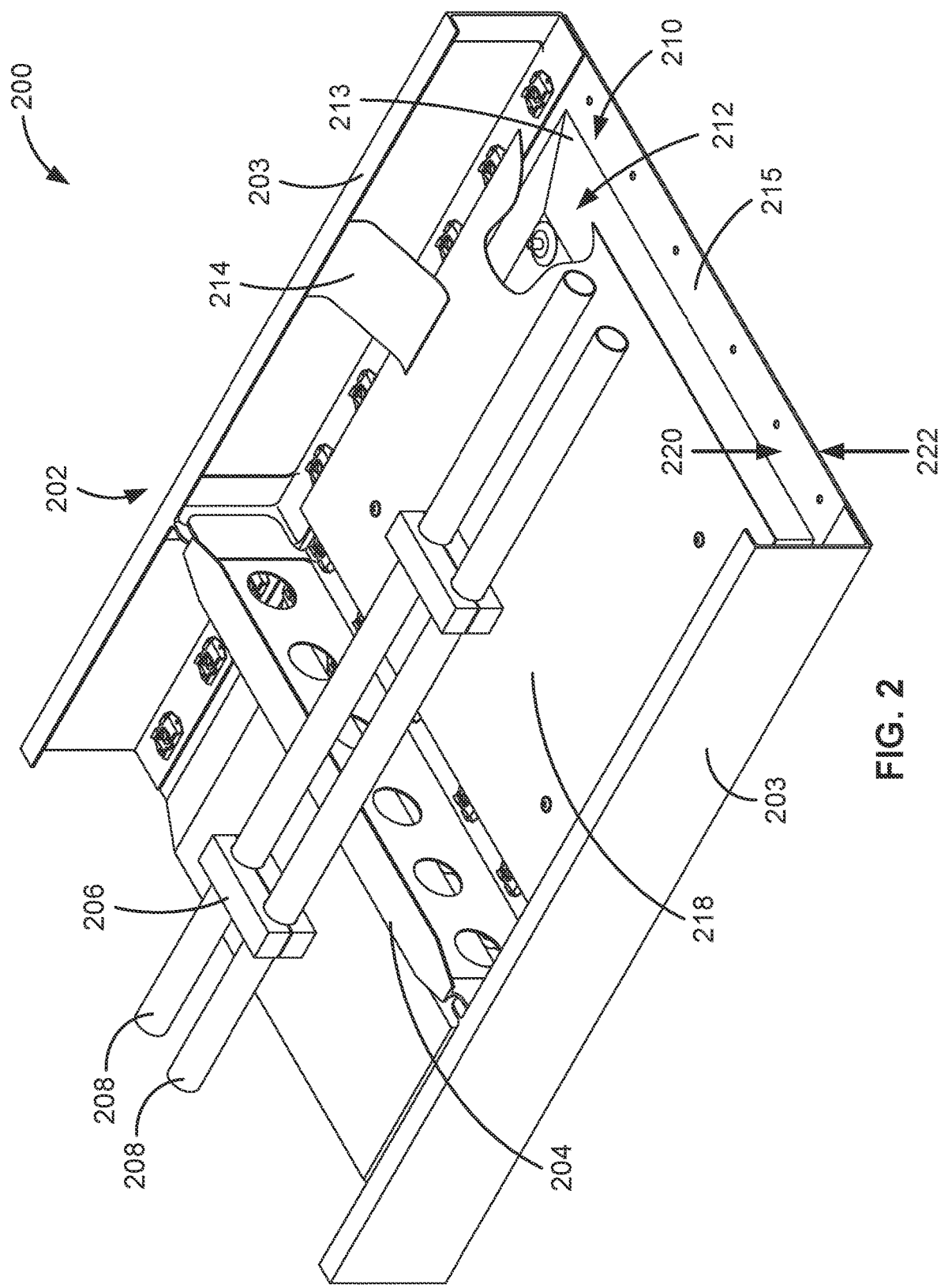
FIG. 2 is an isometric view of an example composite panel assembly in accordance with teachings of this disclosure.

FIG. 2 is an isometric view of an example composite panel assembly 200 in accordance with teachings of this disclosure. In the illustrated example of FIG. 2, the composite panel assembly 200 includes and/or is coupled to a frame (e.g., subframe, a support structure, etc.) 202. The example frame 202 is coupled to and/or includes braces (e.g., side braces, side walls, etc.) 203, as well as a cross-brace 204. As can be seen in this example, a brace/support 206 is shown supporting conduits (e.g., electrical conduits, wiring conduits, hydraulic conduits, etc.) 208, which are at least partially composed of metal. Further, an exterior panel (e.g., a laminate panel, a sandwich panel, a panel with a honeycomb core, a composite panel, etc.) 210 at least partially composed of a composite material is supported and/or positioned by the aforementioned frame 202, the braces 203 and/or the cross-brace 204. In this example, the exterior panel 210 includes a rear/interior surface or side 212 defining a ramped or inclined portion 213 that leads to a narrow portion (e.g., a narrow contacting/interfacing portion) 215.

In the illustrated example of FIG. 2, to provide a ground path for a lightning strike at or proximate the exterior panel 210, a spring 214 extends from at least one of the braces 203 and/or the frame 202 to contact and engage an electrically conductive shield panel (e.g., a metal shield, a metallic shield, a metal alloy shield, etc.) 218 that is placed at a first side (e.g., an interior side, an interior facing side) 220 of the exterior panel 210 where the first side is opposite of a second side (e.g., an exterior side, an exterior facing side) 222 of the exterior panel 210. Further, the example spring 214 is coupled and/or fastened to the braces 203 to define an electrical ground path between the shield 218 and the braces 203, which at least partially defines an electrically conductive portion of the frame 202 in this example. In examples where the braces 203 and/or the frame 202 are not electrically conductive (e.g., the frame and/or the braces 203 are composed of a composite material or insulative material), the spring 214 can be coupled and/or fastened to a wire or other electrically conductive components supported by the frame 202. As a result of electrically coupling the frame 202 to the shield panel 218 via the spring 214, a lightning strike or other electrical discharge to the exterior panel 210 (e.g., a lightning strike that punctures and/or passes through the exterior panel 210) can be grounded to the braces 203 via the shield panel 218 and the spring 214, as opposed to the conduits 208 described above.

While the spring 214 is depicted as a leaf spring-like device in the illustrated example of FIG. 2, the spring 214 can be implemented as any appropriate other component, device and/or mechanism that enables electrical contact. Further, while one of the springs 214 is depicted in the example of FIG. 2, any appropriate other number of springs (e.g., two, three, four, five, ten, twenty, etc.) can be implemented instead.

FIG. 3 is a cross-sectional view of a known composite panel assembly 300. In the illustrated view of FIG. 3, a metal or metallic shield panel 302 is positioned at an offset and/or distance from the exterior panel 210. In particular, the shield panel 302 is fixed and/or coupled to a brace 304 via at least one fastener 306. In contrast to examples disclosed herein, installation and access (e.g., for maintenance, repair and/or service) of the shield panel 302 can be time-consuming due to a difficulty of accessing the fastener(s) 306, as well as a potential need to remove components associated with the brace 304 and/or the brace 304 itself to replace and/or install the shield panel 302.

FIG. 4 is a cross-sectional view of the example composite panel assembly 200 of FIG. 2. In the illustrated example of FIG. 4, the shield panel 218 contacts and engages the spring 214 to define an electrical coupling therebetween. The spring 214 of the illustrated example includes a base portion 402, a ramped or angled portion 404 and a curved portion (e.g., a curved distal portion, an arcuate portion, an arcuate distal portion, etc.) 406 having a generally curved or arcuate shape. Accordingly, the base portion 402 of the spring 214 is coupled to (e.g., fastened to, fixed to, welded to, adhered to, etc.) a respective one of the walls 410 that at least partially defines the frame 202 and/or the brace 203. In turn, a flange 412 that extends from the wall 410 is utilized to support, align, couple and/or position the exterior panel 210 and, similarly, a flange 414 extends from the wall 410. The flange 414 can be utilized to mount the composite panel assembly 200 to another vehicle structure (e.g., an inner frame or support), for example. Further, in this example, the exterior panel 210 is depicted offset from the shield panel 218.

To couple the shield panel 218 to the exterior panel 210 while maintaining an offset therebetween, a spacer 416, which has a generally flanged shape in this example, is coupled to a rear surface 417 of the exterior panel 210 and, in turn, the example spacer 416 includes an aperture (e.g., a threaded aperture) to receive a fastener 418 to secure the shield panel 218 to the spacer 416. As a result, the shield panel 218 can be easily replaced, accessed and/or serviced when the exterior panel 210 is separated from frame 202 and/or the braces 203. According to examples disclosed herein, the exterior panel 210 and the shield panel 218 are replaced as an assembly.

In this example, the base portion 402 of the spring 214 is rigidly coupled to (e.g., adhered to, welded to, coupled to with the use of mechanical and/or chemical fasteners, etc.) the frame 202. In other examples, the spring 214 is coupled to the shield panel 218 instead of the frame 202. In such examples, positioning the shield panel 218 onto/into the frame 202 causes the spring 214 to contact and engage the frame 202 (or an electrically conductive portion of the frame 202) and/or the brace 203. In yet other examples, the spring 214 is removably/releasably couplable to at least one of the frame 202 or the exterior panel 218 (e.g., via an interference fit, a snap fit, etc.).

Figure 5:
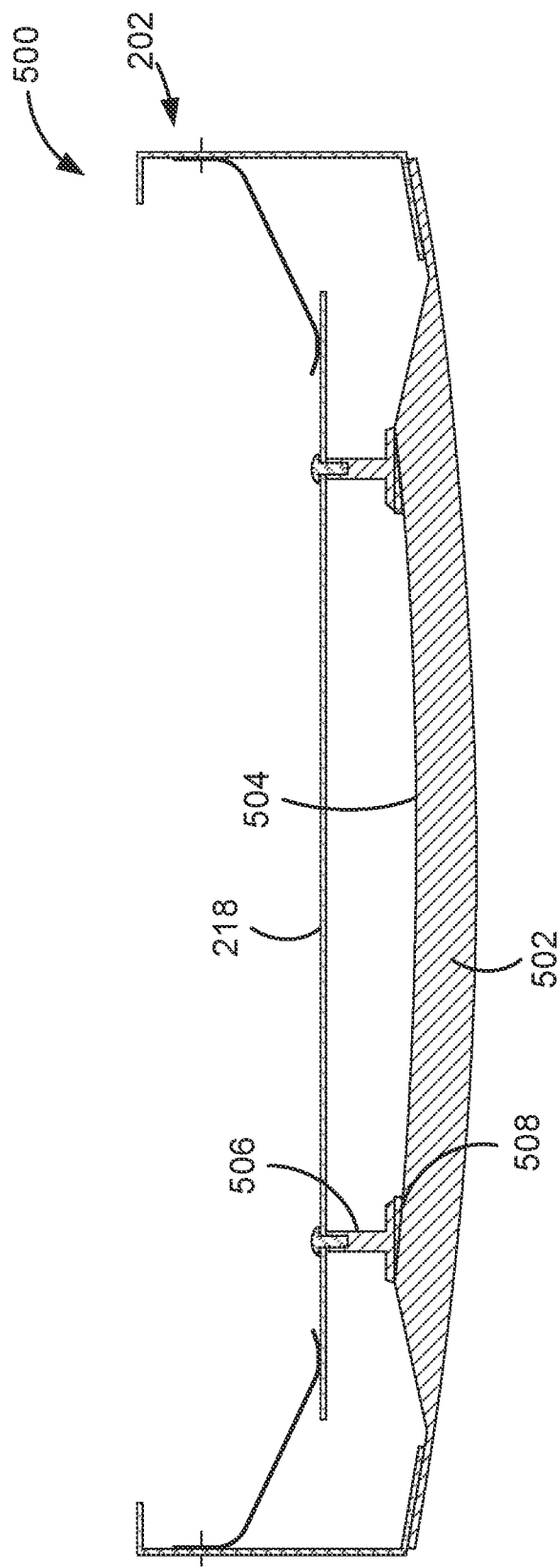
FIG. 5 is a cross-sectional view of an alternative example composite panel assembly.

FIG. 5 is a cross-sectional view of an alternative example composite panel assembly 500. The composite panel assembly 500 of the illustrated example is similar to the example composite panel assembly 200 shown in FIGS. 2 and 4, but instead includes a curved exterior panel 502 at least partially defining a curved interior surface 504. In this example, a standoff 506 in conjunction with a curved or inclined shim 508 to accommodate for curvature of the interior surface 504, thereby enabling the shield panel 218 to be aligned and positioned relative to the exterior panel 210 as well as the frame 202 despite the curvature of the interior surface 504.

Figure 6A:
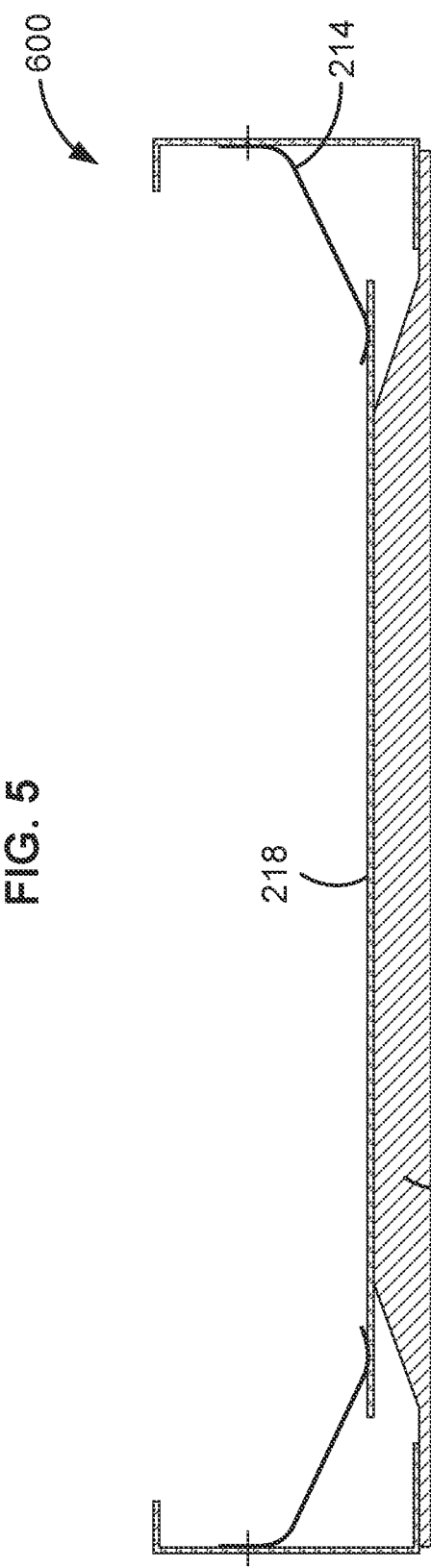
FIG. 6A is a cross-sectional view of another alternative example composite panel assembly.

FIG. 6A is a cross-sectional view of another alternative example composite panel assembly 600. In this example, the shield panel 218 is directly coupled/attached to the exterior panel 210. In other words, the shield panel 218 and the exterior panel 210 are not separated by a significant (or any) distance or a gap therebetween. Accordingly, the spring 214 being brought into direct contact with the shield panel 218 enables a reduced vertical height (in the view of FIG. 6A) in comparison to the examples shown in FIGS. 4 and 5 and, thus, a relatively compact composite panel arrangement.

Figure 6B:
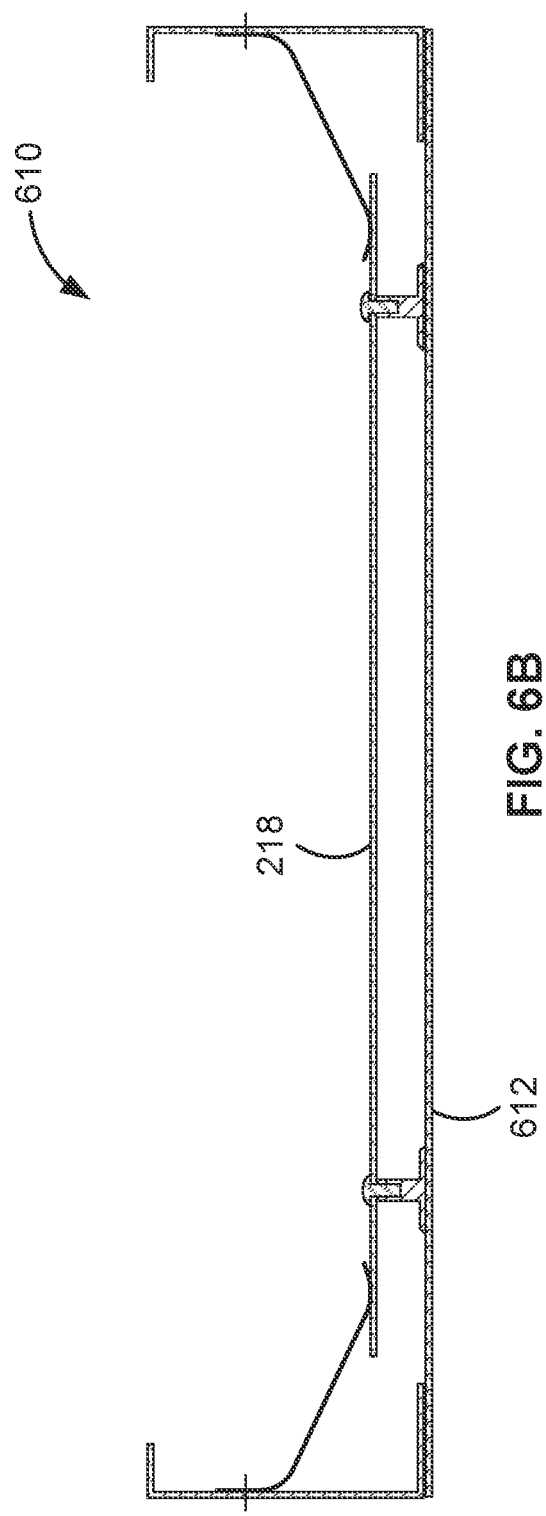
FIG. 6B is a cross-sectional view of another alternative example composite panel assembly.

FIG. 6B is a cross-sectional view of another alternative example composite panel assembly 610. In this example, the shield panel 218 is directly coupled/attached to an exterior panel 612. In this example, the exterior panel 612 is implemented as solid laminate panel. However, any appropriate material and/or composite structure can be implemented instead.

FIGS. 7A-7C are detailed cross-sectional views of the example composite assembly 200 shown in FIGS. 2 and 4. Turning to FIG. 7A, the spring 214 is shown separated from the shield panel 218 as the exterior panel 210 (along with the shield panel 218 coupled thereto) is being assembled onto the brace 203. In the illustrated view of FIG. 2, the ramped portion 404 of the spring 214 is shown oriented at an angle 702 prior to the curved portion 406 of the spring 214 contacting the shield panel 218.

FIG. 7B depicts the exterior panel 210 assembled to the brace 203. In particular, the narrow portion 215 of the exterior panel 210 is brought into contact with the flange 412 of the brace 203, thereby aligning the exterior panel 210 to the brace 203. As a result, the shield panel 218 is brought into contact with the spring 214 such that the ramped portion 404 of the spring 214 is oriented at an angle 704. In particular, the spring 214 is elastically deformed and/or deflected upon contact of the curved portion 406 with the shield panel 218 such that the angle 704 is less than the angle 702 shown in FIG. 7A.

FIG. 7C depicts a detailed view of an example contact strip (e.g., rub strip) 710 that can be implemented in examples disclosed herein. The example contact strip 710 can be metal or metallic, and may have a similar thickness (e.g., within 10% of) in comparison to a thickness of the shield panel 218. In the illustrated example of FIG. 7C, the ramped portion 404 of the spring 214 is elastically deformed as the curved portion 406 contacts and/or slides against the contact strip 710, which is generally flat in this example. According to examples disclosed herein, utilization of the contact strip 710 may enable increased reliability and resistance to wear, etc.

Figure 8A:
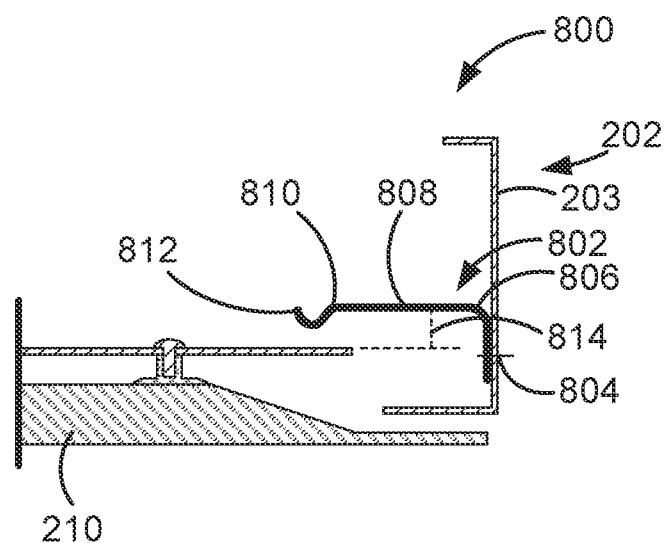
FIGS. 8A and 8B are detailed cross-sectional views of another alternative example composite assembly.
Figure 8B:
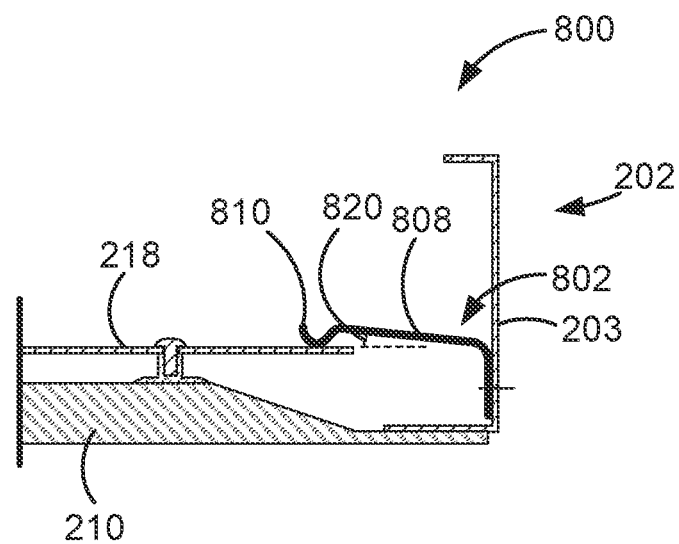

FIGS. 8A and 8B are detailed cross-sectional views of another alternative example composite assembly 800. Turning to FIG. 8A, the example composite assembly 800 is shown with a spring 802 that is similar to the spring 214 shown in FIGS. 2 and 4-7C, but includes a different contact geometry and associated deflection characteristics. The example spring 802 is fixed to the frame 202 and, in turn, includes a base portion 804 with a corresponding bend 806, a medial portion (e.g., a flat medial portion) 808 and a curved portion (e.g., a hook) 810 resembling a hook having a distal end 812. In the illustrated view of FIG. 8A, the medial portion 808 is oriented at an angle 814, which is substantially horizontal in the view of FIG. 8A due to the exterior panel 210 (and the shield panel 218) not yet being assembled to the brace 203 of the frame 202.

FIG. 8B depicts the exterior panel 210 assembled to the brace 203 of the frame 202 of FIG. 2, thereby causing the curved portion 810 to contact the shield panel 218 and, thus, deflect the medial portion 808 and/or the spring 802 such that the medial portion 808 is inclined relative to the shield panel 218 at an angle 820, in contrast to the relatively horizontal orientation shown in FIG. 8A.

FIGS. 9A and 9B depict an example composite panel assembly 900 with a non-electrically conductive frame architecture. Turning to FIG. 9A, the composite panel assembly 900 is shown with a frame 901 defining or including a composite material (or other electrically isolating material) brace 903. In this example, the frame 901 and/or the brace 903 support and/or carry an electrically conductive portion (e.g., an electrically conductive plate, strip, wire, etc.) 902.

FIG. 9B is a detailed cross-sectional view of the example composite panel 900 of FIG. 9A. In this example, the brace 903 is shown supporting the electrically conductive portion 902. Further, a spring 904 is electrically coupled to the electrically conductive portion 902 at a base 906. As a result, the shield panel 218, which is supported by the exterior panel 210, is electrically coupled to the spring 904 and, in turn, the electrically conductive portion 902. In some examples, the spring 904 is electrically coupled to a plate or other conductor (e.g., an interior plate or chassis structure) that extends through an interior defined by the exterior panel 210.

Figure 10:
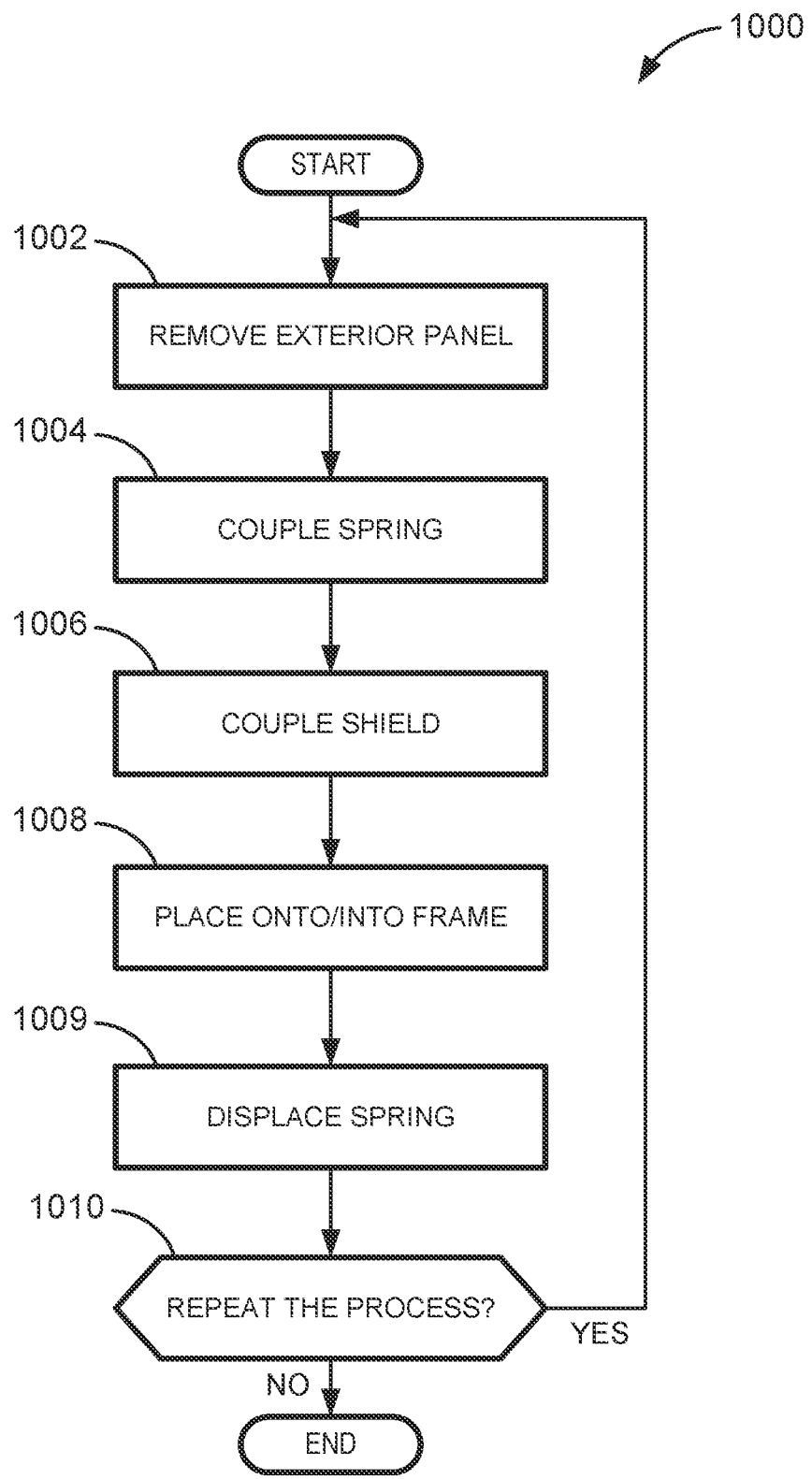
FIG. 10 is a flowchart representative of an example method to produce examples disclosed herein.

FIG. 10 is a flowchart representative of an example method 1000 to produce/assemble examples disclosed herein and/or retrofit examples disclosed herein onto existing vehicle frames and/or structures that support exterior panels. In other words, the example method 1000 can be applied to manufacturing, assembly or retrofitting an existing structure and/or vehicle.

At block 1002, in examples where a retrofit is being performed (e.g., onto an existing vehicle or stationary structure), an exterior panel (e.g., the exterior panel 210, the exterior panel 612) is removed.

At block 1004, in this example, a spring (e.g., the spring 214, the spring 802) is attached and/or coupled to a frame (e.g., the frame 202). Alternatively, the spring is attached and/or coupled to a shield panel (e.g., the shield panel 218).

At block 1006, in some examples, the aforementioned shield panel is coupled to the exterior panel. According to examples disclosed herein, the shield panel can be placed to directly contact the exterior panel or a spacer or other similar component/device that is utilized to define spacing between the exterior panel and the shield panel.

At block 1008, the exterior panel and/or the shield panel is placed onto/into the frame. In this example, the exterior panel supporting the shield panel is positioned and/or aligned by the frame.

At block 1009, based on the exterior panel (and the shield panel) being placed onto the frame, the spring is displaced (e.g., deflected, compressed, etc.). In particular, the spring is compressed and/or deflected as the spring contacts the shield panel, thereby electrically coupling the shield panel to the frame and/or an electrically conductive portion/device (e.g., a wire, an exposed metal contact, etc.) supported by the frame.

At block 1010, it is determined whether to repeat the process. The determination may be based on whether additional exterior panel assemblies are to be produced, retrofit and/or assembled, for example. If it is determined to repeat the process (block 1010), control of the process returns to block 1002. Otherwise, the process ends.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

Example methods, apparatus, systems, and articles of manufacture to enable lightning protection panels that can be serviced and maintained in a relatively quick manner are disclosed herein. Further examples and combinations thereof include the following:

Example 1 includes an apparatus comprising a frame supporting an exterior panel, the exterior panel having a first side that at least partially defines an exterior surface of a vehicle, a shield panel placed at a second side of the exterior panel opposite the first side, and a spring extending from the frame at a first portion of the spring, a second portion of the spring being at least one of ramped or curved, the second portion contacting the shield panel to define an electrical coupling between the shield panel and an electrically conductive portion associated with the frame.

Example 2 includes the apparatus as defined in example 1, further including a spacer between the shield panel and the exterior panel.

Example 3 includes the apparatus as defined in example 2, wherein the spacer includes an aperture to receive a fastener that couples the shield panel to the spacer.

Example 4 includes the apparatus as defined in any of examples 1 to 3, wherein the second portion includes an arcuate distal end that contacts a surface of the shield panel.

Example 5 includes the apparatus as defined in any of examples 1 to 4, wherein the shield panel contacts the second side of the exterior panel.

Example 6 includes the apparatus as defined in any of examples 1 to 5, wherein the spring is to elastically deform against the shield panel when the shield panel is placed into the frame.

Example 7 includes the apparatus as defined in any of examples 1 to 6, wherein the spring includes a base portion to contact the electrically conductive portion of the frame, an angled portion that extends from the base portion, the angled portion inclined relative to the base portion, and a curved or arcuate distal end to contact the shield panel.

Example 8 includes the apparatus as defined in any of examples 1 to 7, wherein the second side is curved.

Example 9 includes an exterior panel assembly for use with a vehicle, the exterior panel assembly comprising an exterior panel to at least partially define an external surface of the vehicle, an electrically conductive frame to position the exterior panel relative to the external surface, an electrically conductive shield placed at an interior volume of the exterior panel assembly, and a spring coupled to at least one of the frame or the shield, the spring being ramped relative to the shield and extending between (i) at least one of the frame or an electrically conductive component associated with the frame, and (ii) the shield to define an electrical coupling therebetween.

Example 10 includes the exterior panel assembly as defined in example 9, wherein the spring is to elastically deform against the shield when the shield is placed into the frame.

Example 11 includes the exterior panel assembly as defined in any of examples 9 or 10, wherein the shield contacts the exterior panel.

Example 12 includes the exterior panel assembly as defined in example 11, wherein the shield is coupled to the exterior panel.

Example 13 includes the exterior panel assembly as defined in any of examples 9 to 12, further including a spacer between the exterior panel and the shield.

Example 14 includes the exterior panel assembly as defined in any of examples 9 to 13, wherein the frame includes a wall coupled to the spring, and a flange extending from the wall to support and align the exterior panel.

Example 15 includes the exterior panel assembly as defined in any of examples 9 to 14, wherein the spring includes a base portion to contact the frame, an angled portion that extends from the base portion, the angled portion inclined relative to the base portion, and a curved or arcuate distal end to contact the shield.

Example 16 includes the exterior panel assembly as defined any of examples 9 to 15, wherein the exterior panel is curved.

Example 17 includes a method comprising placing a shield panel at an interior facing side of an exterior panel that is supported by a frame, the exterior panel having an exterior facing side opposite the interior facing side, the exterior facing side at least partially defining an exterior surface of a vehicle, and displacing a spring extending from the frame at a first portion of the spring, the spring at least one of ramped or curved, the spring displaced to define an electrical coupling between the shield panel and an electrically conductive portion associated with the frame.

Example 18 includes the method as defined in example 17, further including coupling the spring to the frame.

Example 19 includes the method as defined in any of examples 17 or 18, wherein the shield panel is placed to contact an inner surface of the exterior panel.

Example 20 includes the method as defined in example 19, further including coupling the shield panel to the exterior panel.

From the foregoing, it will be appreciated that example systems, apparatus, articles of manufacture, and methods have been disclosed that enable cost-effective lightning strike protection. Examples disclosed herein also facilitate assembly, manufacturing and servicing, thereby enabling cost savings with respect to manufacturing time, downtime and/or associated labor.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. An apparatus comprising:
   a frame supporting an exterior panel, the exterior panel having a first side that at least partially defines an exterior surface of a vehicle;
   a shield panel placed at a second side of the exterior panel opposite the first side;
   a spring extending from the frame at a first portion of the spring, a second portion of the spring being at least one of ramped or curved, the second portion contacting the shield panel to define an electrical coupling between the shield panel and an electrically conductive portion associated with the frame; and
   a spacer between the shield panel and the exterior panel, wherein the spacer includes an aperture to receive a fastener that couples the shield panel to the spacer.

2. The apparatus as defined in claim 1, wherein the second portion includes an arcuate distal end that contacts a surface of the shield panel.

3. The apparatus as defined in claim 1, wherein the shield panel contacts the second side of the exterior panel.

4. The apparatus as defined in claim 1, wherein the spring is to elastically deform against the shield panel when the shield panel is placed into the frame.

5. The apparatus as defined in claim 1, wherein the spring includes:
 a base portion to contact the electrically conductive portion of the frame,
 an angled portion that extends from the base portion, the angled portion inclined relative to the base portion, and
 a curved or arcuate distal end to contact the shield panel.

6. The apparatus as defined in claim 1, wherein the second side is curved.

7. The apparatus as defined in claim 1, wherein the spring has a curved or arcuate distal end.

8. The apparatus as defined in claim 7, wherein the spring has a hook-shaped distal end.

9. An exterior panel assembly for use with a vehicle, the exterior panel assembly comprising:
 an exterior panel to at least partially define an external surface of the vehicle;
 a frame to position the exterior panel relative to the external surface;
 an electrically conductive shield placed at an interior volume of the exterior panel assembly; and
 a spring coupled to at least one of the frame or the shield, the spring being ramped relative to the shield and extending between (i) at least one of the frame or an electrically conductive component associated with the frame, and (ii) the shield to define an electrical coupling therebetween, wherein the frame includes: (i) a wall coupled to the spring; and (ii) a flange extending from the wall to support and align the exterior panel.

10. The exterior panel assembly as defined in claim 9, wherein the spring is to elastically deform against the shield when the shield is placed into the frame.

11. The exterior panel assembly as defined in claim 9, wherein the shield contacts the exterior panel.

12. The exterior panel assembly as defined in claim 11, wherein the shield is coupled to the exterior panel.

13. The exterior panel assembly as defined in claim 9, further including a spacer between the exterior panel and the shield.

14. The exterior panel assembly as defined in claim 9, wherein the spring includes:
 a base portion to contact the frame,
 an angled portion that extends from the base portion, the angled portion inclined relative to the base portion, and
 a curved or arcuate distal end to contact the shield.

15. The exterior panel assembly as defined in claim 9, wherein the exterior panel is curved.

16. A method comprising:
 placing a shield panel at an interior facing side of an exterior panel that is supported by a frame, the exterior panel having an exterior facing side opposite the interior facing side, the exterior facing side at least partially defining an exterior surface of a vehicle; and
 displacing a spring extending from the frame at a first portion of the spring, the spring at least one of ramped or curved, the spring displaced to define an electrical coupling between the shield panel and an electrically conductive portion associated with the frame, wherein the frame includes: (i) a wall coupled to the spring; and (ii) a flange extending from the wall to support and align the exterior panel.

17. The method as defined in claim 16, further including coupling the spring to the frame.

18. The method as defined in claim 16, wherein the shield panel is placed to contact an inner surface of the exterior panel.

19. The method as defined in claim 18, further including coupling the shield panel to the exterior panel.

20. An apparatus comprising:
 a frame supporting an exterior panel, the exterior panel having a first side that at least partially defines an exterior surface of a vehicle;
 a shield panel placed at a second side of the exterior panel opposite the first side;
 a spring extending from the frame at a first portion of the spring, a second portion of the spring being at least one of ramped or curved, the second portion contacting the shield panel to define an electrical coupling between the shield panel and an electrically conductive portion associated with the frame, wherein the frame includes: (i) a wall coupled to the spring; and (ii) a flange extending from the wall to support and align the exterior panel.

* * * * *